E. O. SCHWEITZER.
MEANS AND METHOD FOR METERING ELECTRICITY.
APPLICATION FILED AUG. 18, 1915.

1,264,982.

Patented May 7, 1918.
3 SHEETS—SHEET 2.

Witnesses:
Harry S. Gaither
Leonard E. Bogue

Inventor:
Edmund O. Schweitzer
by Williams & Bradbury
Attys

UNITED STATES PATENT OFFICE.

EDMUND O. SCHWEITZER, OF CHICAGO, ILLINOIS.

MEANS AND METHOD FOR METERING ELECTRICITY.

1,264,982.  Specification of Letters Patent.  Patented May 7, 1918.

Application filed August 18, 1915. Serial No. 46,165.

*To all whom it may concern:*

Be it known that I, EDMUND O. SCHWEITZER, a citizen of the United States, residing at Chicago, in the county of Cook and State of Illinois, have invented a certain new and useful Improvement in Means and Methods for Metering Electricity, of which the following is a full, clear, concise, and exact description, reference being had to the accompanying drawings, forming a part of this specification.

My invention relates to the art of electricity metering and broadly stated the object of my invention is to provide a simple and inexpensive method and apparatus for accurately metering the consumption of electricity, and more particularly means for affording a satisfactory basis for payment to the central station company by the consumer for electrical energy furnished to and consumed by him.

The systems now generally employed by central station companies not only require expensive equipment subject to rapid deterioration and entailing a high cost for maintenance but also require office labor and supervision of such a high grade and cost that a considerable portion of the possible earnings of the central station companies, particularly where the customers are scattered over a large area and consume relatively small quantities of electrical energy per month, is not only lost but business of this class is oftentimes done at an actual loss to the central station company.

My invention hereinafter described and claimed, provides a system of electrical measurement and power control particularly applicable without danger of inaccurate measurement or lack of proper control, to that class of business hereinbefore mentioned as unprofitable, and renders such class of business profitable to the central station company. Broadly stated, I accomplish this desirable end by providing means, preferably located at the point of energy consumption, arranged and adapted to prevent the further consumption of energy at that point, as by opening or otherwise rendering the load circuit inoperative after a previously determined quantity of electrical current or energy has been consumed.

The specific embodiment of my invention hereinafter described comprises a unit arranged to be applied to an outlet or socket at the subscriber's station and which, when in use, is interposed between the outlet or socket and the translating device or devices. This unit is designed to permit the passage of a certain previously determined quantity of electricity. After the aforesaid measured electricity supply has been completed, the circuit for the translating device or devices is opened, or otherwise rendered inoperative, and it then becomes necessary to secure a new unit or units of this kind from the central station company.

My invention can readily be adapted for use by consumers whose equipment is of the usual type comprising the ordinary standard outlets or sockets, by so changing said sockets or outlets that they cannot receive a standard plug but will receive the plug forming a part of the meter unit. Of course, special sockets may be furnished at the consumer's outlet, if desired, and I contemplate this whenever it is desirable or convenient to do so.

In accordance with my invention, I render the subscriber's load circuit inoperative after a predetermined quantity of electricity has been consumed, by the electrolytic action upon a part of the consumer's load circuit. A preferred arrangement for accomplishing this end is to include in series with the consumer's load circuit a conductor, for instance a cylinder of copper which forms the anode of an electrolytic cell. An electrolytic circuit is established when the load circuit is in use, as, for instance, by establishing a shunt circuit including the electrolytic cell across the conductors leading to the translating devices. The resulting electrolytic action causes the gradual disintegration and dissolution of the cylinder as the consumption of electricity continues. The arrangement is such that the copper cylinder is completely dissolved after a predetermined amount of electricity has been consumed, and the circuit for the translating device or devices is thus opened.

I have found that before the energy supplied to the consumer's translating device or devices is cut off, the consumer should preferably be notified that this is about to happen. Accordingly I provide means for giving the consumer ample notice in order that he may purchase and substitute a new meter unit before his electricity supply is entirely cut off.

My invention moreover provides a means and method for discouraging the consumption of electricity at a rate greater than a predetermined maximum, and for penalizing the consumer whenever the rate of consumption exceeds a predetermined maximum.

These and other features of my invention will be more fully explained in the following detailed description in which reference is made to the accompanying drawings, in which—

Similar characters of reference refer to similar parts throughout the several views.

Figure 1:
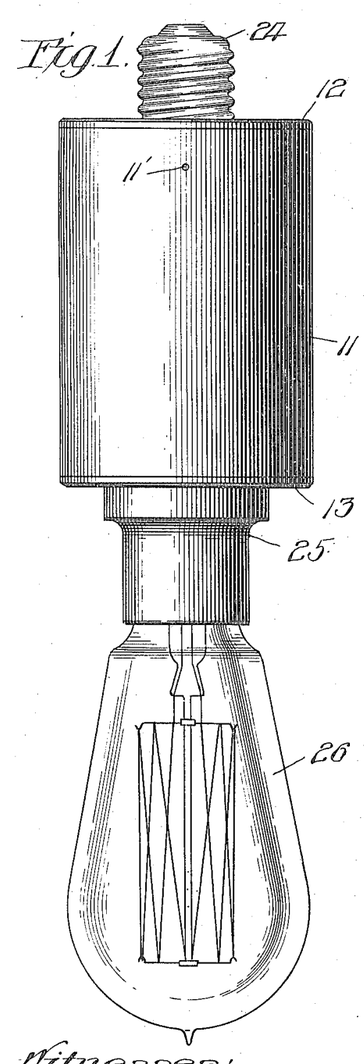
Figure 1 is an elevational view of a meter unit embodying my invention.
Figure 2:
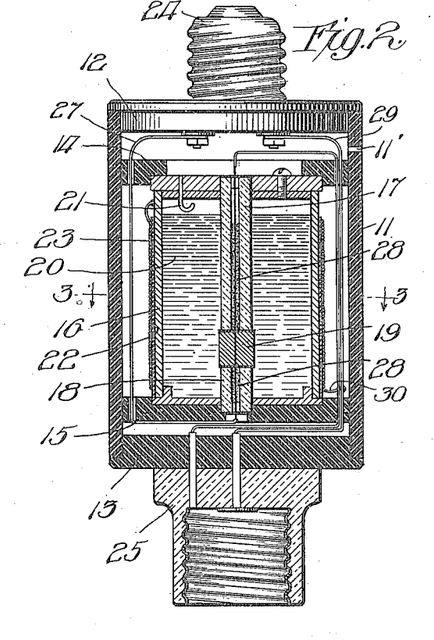
Fig. 2 is a vertical axial sectional view of the same.
Figure 3:
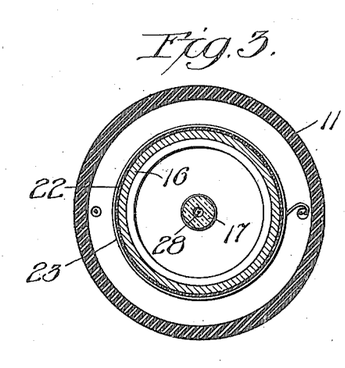
Fig. 3 is a horizontal sectional view taken on the line 3—3 of Fig. 1, looking in the direction indicated by the arrows.

Referring first to Fig. 1, I have illustrated at 11 a cylinder of hard rubber, fiber, or other non-conducting material, the said cylinder being provided with suitable heads or end closures 12 and 13 of the same material. Disposed within the cylinder 11 between the heads 12 and 13 are the spaced disks 14 and 15, both of which are of suitable insulating material. Supported between the disks 14 and 15 is a copper cylinder 16 which, as will presently appear, constitutes the cathode of an electrolytic cell. The hollow cylinder 16 is provided with suitable heads, as illustrated, and passing through the heads of the cylinder 16 are the glass tubes, indicated at 17 and 18. The glass tubes 17 and 18 are cemented to the heads of the copper cylinder 16 at the points where they pass therethrough in order to prevent the escape of liquid from the copper cylinder or electrolyte container 16. The inner end of each of the glass tubes 17 and 18 abuts against and is cemented to a copper cylinder 19 of known weight. This copper cylinder 19 constitutes the anode of the electrolytic cell previously referred to. The hollow cylinder or receptacles 16 is arranged to contain an electrolyte, conveniently in the form of a neutral copper sulfate solution, illustrated at 20. The upper head of the cathode and electrolyte container 16 is provided with a capillary tube 21 to permit the escape of vapor from the space above the electrolyte but preventing the escape of the liquid electrolyte. An aperture 11' is conveniently formed in the upper end of the external cylinder 11 to permit the escape of vapor from the upper end of the said cylinder.

Disposed around the copper cylinder or anode 16 is a sleeve 22 of insulating material upon which is wound a resistance winding 23 of suitably insulated wire.

Disposed upon the head 12 of the external cylinder 11 is a plug 24 arranged to be threaded into a consumer's outlet or receptacle which, as I have previously intimated, has desirably been arranged to receive only this special plug of the meter unit. Mounted upon the lower head 13 of the external cylinder 11 is a suitable socket or receptacle 25 arranged to receive the plug of an ordinary electric lamp 26 or a plug electrically connected with any translating device.

The several electrical connections within the meter unit are perhaps most clearly illustrated in Fig. 4 and are as follows:

One terminal of the plug 24 is electrically connected with a conductor 26 passing down through suitable apertures in the disks 14 and 15 and thence passing through the glass tube 18, copper cylinder 19 and glass tube 17 and thence down through suitable apertures in the disks 14 and 15 to one terminal of the socket 27. The ends of the glass tubes 17 and 18 are closed around the conductor 27 by means of any suitable cement, as is most clearly illustrated in Fig. 2. The conductor 27 is conveniently sweated within the copper cylinder 19 and those portions of the conductor which pass through the glass tubes 17 and 18 are surrounded by paraffin, illustrated at 28. The other terminal of the plug 24 is connected by conductor 29 with the corresponding terminal of the socket 25 of the metering unit. A shunt circuit for the electrolytic cell is established by means of a conductor 30 connecting with the conductor 29 intermediate the plug 24 and the socket 25 and connecting the conductor 29 with the copper cylinder 16 which constitutes the cathode for the electrolytic cell. The resistance 22 is interposed in the conductor 30, as is clearly illustrated in Figs. 2 and 4. When the lamp 26, or other translating device, is in use, energy is supplied thereto through the conductors 27 and 29 and at the same time a shunt current passes from the copper cylinder 19 through the electrolyte 20, copper cylinder 16, resistance 23 and conductor 30. This shunt current passing from the anode 19 to the cathode 16 by electrolytic conduction dissolves copper off of the anode 19 and deposits it upon the walls of the cathode 16. This electrolytic action gradually wears away the copper cylinder 19 until finally the circuit through which energy is supplied to the lamp 26 is opened and the lamp is extinguished.

So long as the resistance in the lamp 26, or other translating device associated with the meter unit, remains approximately constant, the shunt current passing through the electrolytic cell bears a constant relationship to the main current and is accurately measured by the weight of copper dissolved from the cylinder 19. It is, therefore, possible to make the cylinder 19 of such weight that it will be entirely consumed and open the circuit when the lamp or other translating device 26 has been in service for a predetermined number of hours. The resistance 23 is, of course, great enough to cut down the amount of energy used for metering purposes to such a point that the amount of energy consumed in the electrolytic cell is not prohibitive. I will state that in operating with 114 volt direct current and maintaining a substantially constant load, I have found that a resistance of substantially 21,000 ohms gives very satisfactory results.

In the operation of the device the copper cylinder 19 is dissolved into the electrolyte and deposited upon the cathode 16 and when the cross-section of the cylinder 19 becomes very small, the slender wire or thread remaining breaks. I have found that after this break occurs, current continues to flow between the broken ends by electrolytic conduction and from time to time the deposit will bridge the ends for a moment and then break away, causing the lamp to flicker distinctly. When this flickering occurs, the consumer is notified that his energy supply is about to be cut off and that it is time for him to substitute a new meter unit for the one in use. After the ends of the conductor 27 have been entirely separated by the dissolution of the copper cylinder 19, the heating of the ends of the conductor 27 melts the paraffin surrounding the same and the paraffin flows over the ends of the conductor 27 and effectually stops further current flow.

Figure 4:
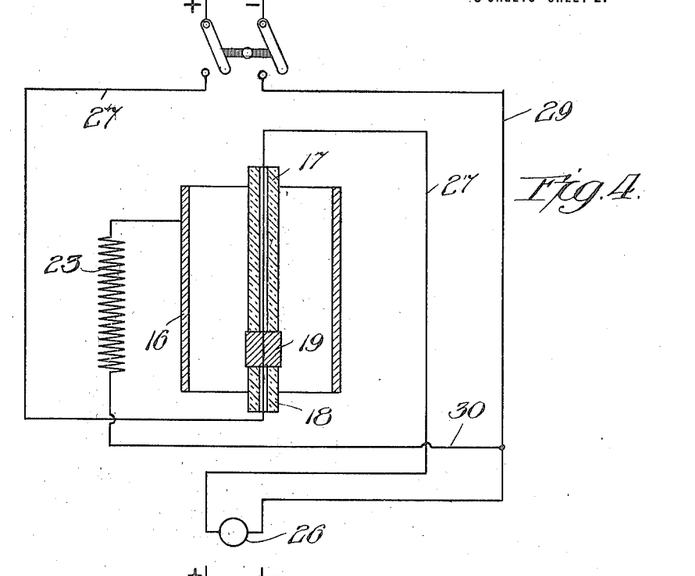
Fig. 4 is a diagrammatic representation of the circuit arrangement employed in the device shown in Figs. 1, 2 and 3.

When the circuit arrangement illustrated in Fig. 4 is made use of, the meter unit accurately measures the main current only so long as the resistance in the translating device or devices remains approximately constant. The current flowing through the shunt depends upon the line voltage and the value of the resistance 23 and does not vary directly with the current through the translating device or devices.

Figure 5:
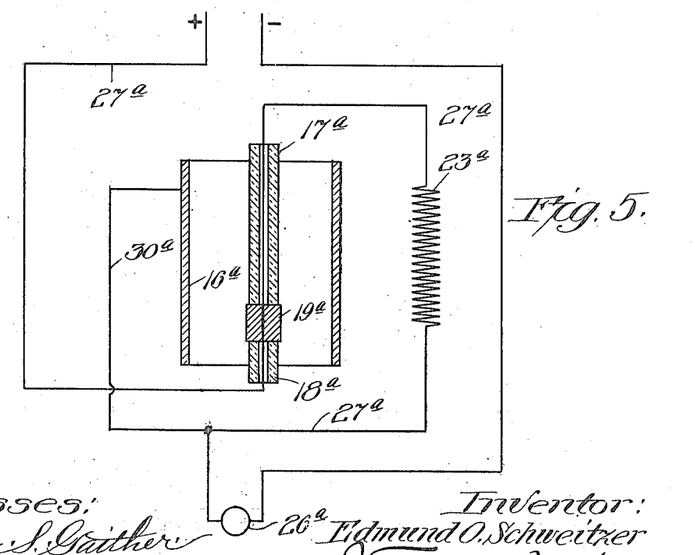
Fig. 5 illustrates a modified circuit arrangement.

In Fig. 5 is illustrated a modified circuit arrangement. When this last mentioned circuit arrangement is used, the electrolytic measuring action depends upon the actual current used. In this figure the same reference characters have been used as in Fig. 4 with the letter "a" suffixed to each reference character. In this modification the resistance $23^a$ is included directly in the circuit for the translating device instead of in the shunt circuit as in Fig. 4. The shunt circuit does not connect with the negative side of the line but is connected with the positive side of the line intermediate the resistance $23^a$ and the translating device or devices $26^a$. The electrolytic measuring apparatus is thus shunted around the resistance $23^a$ which is part of the main circuit. The current flowing through the shunt circuit will vary directly with the current through the resistance $23^a$ and the consumption of the copper on the cylinder $19^a$ depends upon the current consumed by the translating device whatever the value of this current may be. When this arrangement illustrated in Fig. 5 is utilized, it is possible to utilize one meter unit to control several lamps or other translating devices, of various sizes and kinds. When the circuit arrangement illustrated in Fig. 5 is utilized, the resistance should be such as to maintain a certain minimum voltage drop across the electrolytic cell in order to produce a flow of current through the shunt circuit and at the same time minimize as much as possible the voltage drop at the lamp.

When the circuit arrangement illustrated in Fig. 5 is employed, the resistance coil $23^a$ may be so arranged that after the circuit including the translating device or devices is overloaded, the pressure drop through the series resistance $23^a$ will increase to such a point that the service will become undesirable to the consumer.

It will thus be seen that my invention provides means for measuring electricity supply by taking advantage of the electrolytic action of an electric current upon a conductor through which energy is supplied to a translating device. I have described in the present specification but one embodiment of my invention as applied to the metering of direct current, but it will be understood that various modifications and adaptations of the herein described means and method for metering electricity may be made without departing from the scope of my invention.

Figure 6:
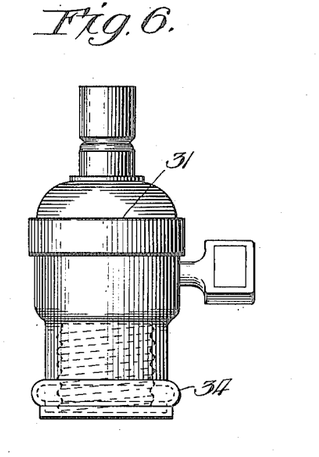
Fig. 6 illustrates an ordinary socket or receptacle provided with means for rendering it incapable of receiving an ordinary plug and adapting it to receive the plug of a meter unit of the type illustrated in Figs. 1 and 2.

In Fig. 6 I have illustrated at 31 an ordinary socket or receptacle provided with means for adapting the socket for use in connection with a special receptacle of the type with which the meter unit is preferably provided. The means employed in this instance is an internally and externally threaded sleeve 32 arranged to be threaded into the socket 31 and provided with a suitable flange 33 arranged to be bent in over the bead 34 of the socket by means of a special tool. When the socket 31 is provided with the sleeve 32, as illustrated, the socket is no longer capable of receiving an ordinary plug but will receive the special plug with which the meter unit is provided.

Figures 7, 8:
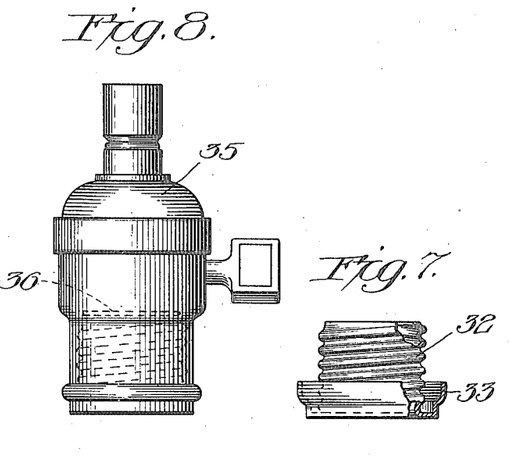
Fig. 7 is an isolated view, partly in elevation and partly in section, of the internally and externally threaded sleeve which may be employed to render the socket shown in Fig. 6 capable of receiving only the plug of the meter unit.
Fig. 8 illustrates an ordinary socket or receptacle provided with modified means for rendering it incapable of use with an ordinary plug.
Figure 9:
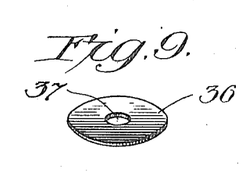
Fig. 9 is a detailed perspective view of the washer with which the socket shown in Fig. 8 is provided.

In Fig. 8 I have illustrated at 35 an ordinary socket or receptacle provided with a modified means for adapting it for use with a special plug with which the meter unit may be provided. The means employed in this connection is a disk 36 forced up into the socket 35, the said disk being provided with a central aperture 37. When this arrangement is used, the plug of the meter unit is provided with a suitable stem capable of being passed through the aperture 37 in the disk 36 when the plug is threaded in the receptacle.

Figure 10:
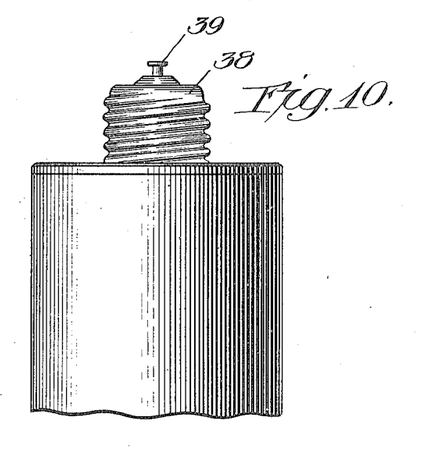
Fig. 10 illustrates a meter unit arranged to coöperate with a socket provided with the washer illustrated in Fig. 9.

In Fig. 10 is illustrated a meter unit comprising a plug 38 equipped with a stem 39 arranged to be so threaded through the aperture 37 in one of the disks 36.

The arrangements illustrated in Figs. 6 to 10 inclusive are merely representative and it will be understood that various arrangements of this kind may be devised to accomplish the same end.

Having thus described my invention, what I claim as new and desire to secure by Letters Patent of the United States is:

1. The method of metering and controlling the flow of current through a circuit upon which a varying voltage is impressed which comprises destroying the conductivity of said circuit when a predetermined quantity of current has passed therethrough, by electrolytically removing a portion of said circuit by a current proportional to but smaller than the current flowing through said circuit.

2. The method which comprises causing a fractional part of the electrical energy supplied to a given circuit to effect the electrolytic disintegration intermediate the ends of a metal conductor forming a part of said circuit at a rate proportional to the consumption of electricity whereby said circuit is opened at said point intermediate the ends of said metallic conductor after a predetermined quantity of electricity has been consumed.

3. The method of metering and controlling the supply of electricity to a circuit, which comprises electrolytically destroying the effective conductivity of a metal conductor forming a part of the circuit at a point intermediate the ends of the said metal conductor after a predetermined quantity of current has passed through said conductor.

4. The method which comprises causing a fractional part of the current supplied to a given circuit electrolytically to disintegrate one of the metallic conductors of said circuit intermediate its ends and thereby open said circuit.

5. The method of metering and controlling the flow of current through a circuit upon which a varying voltage is impressed, which comprises destroying the conductivity of said circuit when a predetermined quantity of current has passed therethrough, by electrolytically removing a portion of said circuit by a constant fractional part of the current flowing through said circuit.

6. An electrolytic meter unit comprising a combined cathode and electrolyte container, an electrolyte in said container, heads for said container, a pair of non-conducting sleeves supported by the container heads, said sleeves disposed with their axes in substantial coincidence and with a space between their adjacent ends, a metal anode disposed between the adjacent ends of said tubes, and electricity conducting means extending through said tubes arranged to connect said anode in series with the conductors of an electric circuit.

7. The method of metering electricity which comprises effecting electrolytic disintegration at one point intermediate the ends of a metallic circuit conductor at a rate proportional to the consumption of electricity whereby to sever the conductor at said point when a certain predetermined quantity of electricity has been consumed.

8. The method of metering electricity which comprises effecting electrolytic disintegration at one point intermediate the ends of a metallic circuit conductor at a rate proportional to the consumption of electricity whereby to sever the conductor at said point when a certain predetermined quantity of electricity has been consumed and thereupon insulating one of the severed ends of said conductor.

9. The method of metering electricity which comprises effecting electrolytic disintegration at one point intermediate the ends of a metallic circuit conductor at a rate proportional to the consumption of electricity whereby to sever the conductor at said point when a certain predetermined quantity of electricity has been consumed and thereupon insulating the aforesaid conductor at the point of severance.

10. The method which comprises causing a fractional part of the current supplied to a given circuit electrolytically to disintegrate one of the metallic conductors of said circuit intermediate its ends whereby to sever said conductor and thereupon insulating one of the severed ends of said conductor.

11. The method of measuring and controlling the supply of electrical energy to a load circuit which consists in causing a small fractional portion of the energy traversing said load circuit electrolytically to disintegrate a portion of one of the circuit conductors and to divide it into two non-connected parts after a predetermined quantity of energy has traversed the load circuit.

12. The method of metering and controlling the supply of electricity which comprises severing one of the metallic conductors of a circuit intermediate its ends by electrolytically disintegrating the same when a predetermined quantity of current has passed through said conductor.

13. A metering unit of the class described comprising, in combination, a container constituting the cathode of an electrolytic cell, an electrolyte in said container, a metal body constituting the anode of said cell, means for connecting said metal body in series with the metallic conductors of an electric work circuit, and electrical connections for directing a part of the current traversing said conductors through the cell to effect electrolytic action within the cell.

14. Apparatus for metering electricity supply comprising, in combination, a container constituting the cathode of an electrolytic cell, an electrolyte within said container, a metal body disposed within said container and immersed in the electrolyte, means for connecting said metal body in series with a translating device or devices, and means for establishing a circuit through the electrolytic cell to dissolve said metal body and open the circuit for the translating device or devices after a predetermined unit of electricity has been consumed by the translating device or devices.

15. An electrolytic meter unit comprising a combined cathode and an electrolyte container, an electrolyte in said container, a pair of alined tubes of non-conducting material supported by the container and projecting into the electrolyte, there being a space between the adjacent ends of said tubes, a metal anode disposed between the adjacent ends of said alined tubes, and electricity conducting means leading from said anode through said tubes.

16. A device of the class described comprising in combination with an electrolyte, a cathode, a pair of alined tubes projecting into the electrolyte, an anode body disposed between the adjacent ends of said tubes, and a wire conductor extending through said tubes and the anode body.

17. A device of the class described comprising in combination with an electrolyte, a cathode, a pair of insulating tubes projecting into the electrolyte, an anode body disposed between adjacent ends of said tubes, and a wire of the same metal as said anode extending through said tubes and the anode body.

18. A device of the class described comprising in combination with an electrolyte, a cathode, a pair of insulating tubes projecting into the electrolyte, an anode body fitted between adjacent ends of said tubes, means for cementing the anode body to the tube ends, and electricity conducting means extending through said tubes adapted to connect said anode in series with the conductors of an electric work circuit.

19. Apparatus for metering electricity comprising in combination with an electrolytic cell consisting of a cathode, electrolyte and an anode, conductors for connecting said anode in series with a wholly metallic work circuit and electricity conducting means for establishing a branch circuit including the cathode and electrolyte whereby a fractional part of the current supplied is diverted from the anode into the electrolyte, said anode being of such mass that the work circuit is opened when a predetermined quantity of electricity has been consumed.

20. In combination with an electrolyte, a cathode, a metal conductor forming a part of an electric circuit having a portion of enlarged cross section and of comparatively short length exposed to the electrolyte, means for insulating the conductor from the electrolyte except at said enlarged portion, and electricity conducting means for establishing a branch circuit including the cathode and electrolyte whereby a fractional part of the current supplied to the work circuit is diverted into the electrolyte from the anode electrolytically to disintegrate the latter.

21. Apparatus for metering electricity, comprising a body connected in series with the conductors of an electric work circuit and with said conductors constituting an entirely metallic work circuit, and means for effecting electrolytic disintegration of the said body at a rate proportional to the consumption of electricity, said body being of such a mass that the work circuit is electrolytically opened when a certain quantity of electricity has been consumed.

22. In combination with the cathode and electrolyte of an electrolytic cell, a metal conductor forming a part of an electric work circuit passing through the electrolyte and insulated from the latter except at one point where it is exposed to the electrolyte, said conductor being of enlarged cross section at its exposed portion and said exposed portion constituting an anode for the cell together with means for diverting a part of the energy traversing said work circuit through the cell to effect the electrolytic disintegration of the conductor-anode and thus open the work circuit.

23. In a system of electricity distribution and measurement, the combination of a work circuit, an electrolytic cell comprising a metal body constituting the anode of said cell, said metal body connected in series with the conductors of said work circuit, and means for establishing a separate circuit through the electrolytic cell to effect the electrolytic disintegration of the aforesaid anode at a rate proportional to the electricity traversing said work circuit, and open the circuit when a predetermined quantity of electricity has been consumed.

24. In combination with an electric circuit including a load, an electrolytic cell comprising a cathode and electrolyte, one of the conductors of the circuit leading into the electrolyte and insulated therefrom except at one point where it is provided with an exposed portion constituting the anode for the cell, and means for establishing a branch circuit including the cathode and electrolyte whereby a fractional portion of the electricity supplied to said circuit is diverted through the cell electrolytically to decompose the exposed portion of the aforesaid conductor, said exposed portion or anode being of such mass that it is decomposed and the circuit opened when a predetermined quantity of electricity has been consumed.

25. In a system of electrical distribution and measurement the combination with a wholly metallic work circuit of an electrolytic cell comprising an electrolyte, cathode, and metal anode, the anode being interposed in series with said work circuit and constituting a conducting part thereof, and means for establishing a branch circuit including the cathode and electrolyte whereby a fractional part of the electricity supplied to said work circuit is diverted through the cell to effect the dissolution of the anode, said anode being of such mass that it is so dissolved that the work circuit is opened when a certain predetermined quantity of electricity has been consumed.

26. In combination with an electrolytic cell comprising an electrolyte, a cathode, a metal anode immersed in the electrolyte, conducting means insulated from the electrolyte leading therethrough to the anode, said insulated conducting means connecting the anode in series with an electric circuit the energy traversing which is to be measured, and means for establishing a branch circuit including the cathode and electrolyte whereby a portion of the energy supplied to said circuit is directed through the cell to effect the electrolytic dissolution of the anode, said metal anode being relatively short in length, but of such cross section that it is electrolytically dissolved and the circuit opened after a predetermined quantity of electricity has been consumed.

27. In a system of electricity distribution and measurement, the combination with a wholly metallic work circuit, an electrolytic cell comprising a cathode and electrolyte, an anode immersed in the electrolyte, conducting means forming a part of said work circuit led through the electrolyte and insulated therefrom, said conducting means connecting the anode in series with the wholly metallic work circuit aforesaid, said anode exposed to the electrolyte, and connections for establishing a branch circuit including the cell whereby a fractional part of the current traversing said work circuit is utilized to effect the electrolytic disintegration of the anode at a rate proportional to the consumption of electricity, said anode being of such mass that the electrolytic action thereon serves to open the work circuit when a certain predetermined quantity of electricity has been consumed.

28. Apparatus for metering electricity comprising a metal body connected in series with the metallic conductors of an electric work circuit and with said conductors constituting a wholly metallic work circuit and means for effecting electrolysis of the said metal body at a rate proportional to the current traversing said circuit, said metal body being of such a mass that the work circuit is opened when a certain predetermined quantity of electricity has been consumed.

29. In an apparatus for metering electricity, an electrolytic cell having as its anode a metal body of determined weight, means for connecting said body in an electric circuit as a conducting part thereof, and means for shunting a fractional part of the current traversing the circuit through the cell to effect the electrolytic dissolution of the aforesaid metal body and open the circuit when a predetermined quantity of electricity has been used.

30. Apparatus for controlling the consumption of electrical energy comprising a metal body constituting the anode of an electrolytic cell and arranged to be connected in series with a translating device, a cathode and electrolyte, and means for establishing a branch circuit including the cell whereby a small fractional part of the electrical energy supplied to the circuit for the translating device is utilized to effect the electrolytic dissolution of said metal body at a rate proportional to the consumption of electrical energy, said metal body being of such mass that the circuit for the translating device is opened when a certain predetermined quantity of electricity has been consumed.

31. In a system of the class described the combination with a load circuit, an electrolytic cell comprising an anode, cathode, and electrolyte, said anode connected in and forming a part of said load circuit, and means for connecting the cell in a branch circuit whereby a small fractional portion of the energy traversing the load circuit is diverted through the cell to effect electrolysis of the anode, said anode being so proportioned that when a predetermined quantity of energy has been consumed the anode is dissolved and the load circuit opened.

32. In a system of the class described the combination with a load circuit, an electrolytic cell comprising an electrolyte and cathode, one of the conductors of said load circuit extending through the electrolyte and having a portion thereof exposed to the electrolyte, said exposed portion constituting an anode for said cell, and means for connecting the cell in a branch circuit whereby the anode portion of said conductor is electrolytically disintegrated at a rate proportional to the energy traversing said load circuit and the conductor divided into two non-connected parts after a predetermined quantity of energy has traversed the load circuit.

33. Electrolytic metering apparatus comprising an electrolyte, a cathode, a metal body constituting an anode, means for connecting the metal body in series with the conductors of an electrical work circuit and means for directing a part of the current traversing said conductors through the cell formed by the electrolyte, cathode and anode aforesaid electrolytically to disintegrate said metal body and open the work circuit after a predetermined quantity of electrical energy has traversed the work circuit.

34. Apparatus for metering electricity supply comprising an electrolytic cell consisting of an electrolyte, a cathode, and a metal body disposed in the electrolyte and constituting an anode, means for connecting said metal body in series with a translating device or devices, and means for establishing a circuit through the electrolytic cell to dissolve said metal body and open the circuit for the translating device or devices after a predetermined unit of electricity has been consumed by the translating device or devices.

35. Apparatus for metering electricity supply comprising an electrolytic cell consisting of an electrolyte, cathode, and anode, a pair of tubes of insulating material projecting into the electrolyte, the anode being in the form of a metal body clamped between the adjacent ends of said tubes, electricity conducting means extending through said tubes adapted to connect said metal body in series with the conductors of an electric work circuit, and means for diverting a part of the current traversing said conductors through the cell.

36. In combination with an electric circuit, an electrolytic cell comprising an anode, cathode, and electrolyte, the anode being in the form of a metal body of determined mass, a pair of co-axial tubes of insulating material projecting into said electrolyte, and electricity conducting means extending through said tubes arranged to connect said metal body in series with the conductors of the said circuit, means for diverting a small portion of the energy traversing said circuit through the cell, and paraffin in one of said tubes surrounding the electricity conducting means therein contained.

37. In combination with an electric circuit, an electrolytic cell comprising an anode, cathode, and electrolyte, the anode being in the form of a metal body of determined mass, a pair of co-axial tubes of insulating material projecting into said electrolyte, and electricity conducting means extending through said tubes arranged to connect said metal body in series with the conductors of the said circuit, means for diverting a small portion of the energy traversing said circuit through the cell, and a non-conducting material having a low melting point surrounding the electricity conducting means in one of said tubes.

38. In combination with an electric circuit, an electrolytic cell comprising an anode, cathode, and electrolyte, the anode being in the form of a metal body of determined mass, a pair of co-axial tubes of insulating material projecting into said electrolyte, and electricity conducting means extending through said tubes arranged to connect said metal body in series with the conductors of the said circuit, means for diverting a small portion of the energy traversing said circuit through the cell, and a waxy non-conducting substance having a low melting point surrounding the electricity conducting means in one of said tubes.

39. A device of the class described comprising in combination an electrolyte container, an electrolyte in said container, a pair of alined tubes projecting into the electrolyte and supported by the container, there being a space between the adjacent ends of said tubes, an anode body clamped between the adjacent ends of said tubes, and means leading through said tubes for connecting the anode in a circuit.

40. An electrolytic metering device comprising a cathode and electrolyte, a metal anode body of determined mass immersed in the electrolyte and exposed thereto, said anode having a substantial cross-section and being comparatively short in length, insulated electricity conducting means extending through the electrolyte to said anode body and connecting said anode body in series with the conductors of an electric work circuit, together with means for diverting a fractional part of the current traversing said circuit through the cell to effect electrolytic disintegration of the anode.

41. An electrolytic metering device comprising a cathode and electrolyte, a pair of co-axial insulating sleeves projecting into the electrolyte and having a space between their adjacent ends, a metal anode of substantial cross section and comparatively short in length disposed between the adjacent ends of said insulating sleeves, and electricity conducting means extending through said sleeves to said anode.

42. Apparatus for metering electricity comprising an electrolyte container constituting the cathode of an electrolytic cell, an electrolyte in said container, a pair of alined insulating tubes projecting into the electrolyte and supported by said container cathode, there being a space between the adjacent ends of said tubes, a metal anode body of determined mass having a substantial cross-section and of comparatively short length disposed between said tubes and exposed to the electrolyte, conductors extending through said tubes for connecting the anode body in series with the work circuit, and means connecting the container cathode with the work circuit so that a definite proportion of the current supply is diverted through the cell to effect the electrolytic disintegration of the anode body.

43. A device of the class described comprising in combination with an electrolyte a cathode, an anode body exposed to the electrolyte, electric conductor leads insulated from the electrolyte and extending therethrough to said anode body, together with means for insulating the exposed end of one of said conductor leads from the electrolyte when the anode is dissolved.

44. Apparatus for metering electricity comprising in combination with an electrolyte, a cathode, a pair of alined tubes projecting into the electrolyte, an anode body disposed between the adjacent ends of said tubes, wire leads extending through said tubes, and an insulating material having a low melting point in one of said tubes.

45. In combination with an electric circuit metering apparatus comprising an electrolyte, an anode body immersed in the electrolyte, a cathode, conductors insulated from the electrolyte and extending therethrough to connect the anode alone in series with said circuit, means electrically connecting the cathode with said circuit at a point away from the anode to establish a branch circuit including the cell, and an impedance in series with said first mentioned circuit insuring a flow of current through the branch circuit.

46. In combination with an electric circuit, metering apparatus comprising an electrolyte container constituting the cathode of an electrolytic cell, an electrolyte in said container, an anode body immersed in said electrolyte, conductors insulated from said electrolyte and extending therethrough to connect the anode in series with said circuit, means electrically connecting the cathode-container with said circuit at a point away from the anode, and a non-inductive resistance in series with said first mentioned circuit insuring a flow of current through the branch circuit.

47. The method of metering electricity which comprises controlling the flow of current through a metallic conductor by gradually removing a predetermined portion of said conductor intermediate its ends while a predetermined quantity of current is passing through said conductor.

In witness whereof, I hereunto subscribe my name this 9th day of August, A. D. 1915.

EDMUND O. SCHWEITZER.

Witnesses:
A. G. McCaleb,
Mary A. Cook.